United States Patent
Malanowski

[19]

[11] Patent Number: 5,911,303
[45] Date of Patent: Jun. 15, 1999

[54] FLIGHT LUG ASSEMBLY

[75] Inventor: Don B. Malanowski, Hilton Head Island, S.C.

[73] Assignee: Riverwood International Corporation, Atlanta, Ga.

[21] Appl. No.: 08/781,681

[22] Filed: Jan. 10, 1997

[51] Int. Cl.⁶ ................................................. B65G 19/24
[52] U.S. Cl. ..................................... 198/731; 198/867.01
[58] Field of Search ............................ 198/731, 803.11, 198/867.01, 867.02, 867.11, 867.12, 867.14, 867.15

[56] References Cited

U.S. PATENT DOCUMENTS

| | | | |
|---|---|---|---|
| 3,961,702 | 6/1976 | Blok | 198/731 |
| 4,394,901 | 7/1983 | Roinestad | 198/850 |
| 4,441,605 | 4/1984 | Ronco et al. | 198/731 |
| 4,756,404 | 7/1988 | Maag et al. | 198/731 |
| 5,165,523 | 11/1992 | Wooley et al. | 198/731 |
| 5,251,888 | 10/1993 | Eugster | 198/803.11 X |
| 5,358,095 | 10/1994 | Curl | 198/698 |
| 5,511,649 | 4/1996 | Wilcher | 198/731 |
| 5,546,734 | 8/1996 | Moncrief et al. | 53/534 |

Primary Examiner—James R. Bidwell
Attorney, Agent, or Firm—Womble Carlyle Sandridge & Rice

[57] ABSTRACT

A flight lug assembly (5) for use on an article transport conveyor (50) is disclosed. The flight lug assembly includes a fill block (7) removably mounted on a flight lug (8), the flight lug being attached to the conveyor chain (35) of the article transport conveyor. The fill block is releasably locked on the flight lug by a spring clip (30) formed as a part of the flight lug, and having a normally biased position extending into engagement with a shoulder (20a, 20b) formed as a part of an elongate groove (19a, 19b) defined in the side surfaces (15, 16) of the fill block, and being in communication with at least a portion of an elongate flight lug slot (18a, 18b), respectively, defined in the respective side surfaces of the fill block, in which the flight lug is received. The second end (33) of the spring clip can be moved yieldably toward the side surface (29) of the flight lug, and will be yieldably held against the side surface of the flight lug within the flight lug slot as the flight lug is passed within either one of the flight lug slots for positioning the fill block on the flight lug, or removing the fill block from the flight lug once the spring clip is unlocked.

12 Claims, 3 Drawing Sheets

FLIGHT LUG ASSEMBLY

FIELD OF THE INVENTION

This invention relates in general to packaging machines for forming articles into groups of articles of a predetermined number, and directing the groups of articles toward and into open containers for being packaged therein. More particularly, the invention relates to a flight lug assembly for use on an article transport conveyor of a packaging machine, the article transport conveyor having a spaced series of flight lug assemblies, each of which has a removable fill block releasably locked on an upstanding flight lug fastened to the article transport conveyor.

BACKGROUND OF THE INVENTION

Continuous motion packaging machines are known in the art. One common type of continuous motion packaging machine is an end loading machine which selects a predetermined number of articles, for example beverage containers, to include bottles and cans, and forms the articles into a desired product group size or configuration, for example six-packs, twelve-packs and full case lots of 24 article containers. Thereafter, the grouped articles are passed into a unitary container, such as pre-formed paperboard carton or sleeve for being packaged therein.

Many continuous motion packaging machines are constructed to have the flexibility to package various product or article group sizes or configurations on the same machine, depending on the desired packaging configuration of the articles, as well as on the size of the articles themselves and the article containers or cartons into which the articles will be passed. These machines typically use a selector device to group the articles and move them as a group toward and through the open end, or ends, of a pre-formed sleeve-type paperboard carton being moved on a carton transport conveyor in the direction of the path of travel at substantially the same speed and in substantially the same direction as the groups of articles being formed by the selector device. The carton transport conveyor is typically provided with a series of spaced and upstanding lugs along its length for forming a series of carton transport flights, or pockets, which sequentially move a spaced series of empty and erect cartons placed therein at an upstream carton opening station. The flights of the carton transport conveyor move in timed relationship with the formation of the groups of articles by the packaging machine selector device. The upstanding lugs of the carton transport conveyor are oftentimes provided with a fill block mounted thereon, the fill block being used in concert with the lug to move the empty and erect cartons, and later the filled cartons, along the path of travel toward a carton sealing station at which the end flaps of the carton will have glued and sealed on the open ends of the cartons.

In those continuous motion packaging machines which have the flexibility to package a variety of article sizes and groupings, the problem thus arises of being able to move the open end, sleeve-type paperboard cartons at high rates of speed in the direction of the path of travel without damaging the paperboard cartons, or allowing the paperboard cartons to become skewed so that the articles being transferred from the article selector device into the carton will jam, or will otherwise bridge across the selector device thus leading to machine shut down in order to remove the damaged and/or jammed paperboard cartons and/or articles. Moreover, another problem which is present in high speed continuous motion packaging machines results from the change of carton sizes as a result of the change in article size, in that it is difficult to employ one universal fill block to handle a variety of carton sizes. One common problem that arises with the use of a relatively short fill block, for example, when used with the relatively tall paperboard carton is that the top of the paperboard carton can lag behind the bottom of the carton carried between the upstanding lugs and fill blocks of the carton transport conveyor, so that the top of the carton trails behind the bottom of the carton, particularly when the carton is empty, so that the carton becomes skewed within the flight/pocket such that the bottom panel of the carton is lifted off of the article transport conveyor creating a step-up or lip between the surface of the conveyor formed as a part of the selector device and the bottom panel of the cartons so that the smooth transfer of articles from the selector device into the empty carton is prevented, which can result in damage to the carton, damage to the articles, as well as jamming of the selector device caused by the bridging of the articles within the flights of the selector device due to their inability to be moved into the empty paperboard cartons carried on the article transport conveyor.

In order to overcome this problem, therefore, removable fill blocks have been developed of varying height and configuration to be used with paperboard cartons of various article group sizings so that the paperboard cartons can be carried within the flights of the article transport conveyor while minimizing this carton flexing or skewing problem to ensure sustained machine efficiencies during high speed packaging operations. One example of such a removable fill block is disclosed in U.S. Pat. No. 5,546,734 to *Moncrief*, et al., issued on Aug. 20, 1996. FIGS. 10A, 10B, 10C, and 11 of *Moncrief*, et al. disclose a leading lug assembly in FIGS. 10B and 10C, and a trailing or pusher lug assembly in FIG. 10A. Each of the fill blocks of these two lug assemblies is constructed and arranged to be removably received on a pair of generally parallel guide pins formed as a part of each one of the respective flight lugs disclosed by *Moncrief*, et al. As shown in FIG. 10C of *Moncrief*, et al., the bottom end of the fill blocks has a lower mating slot adapted to be received on the lower one of the guide pins on the rotating lug, so that the fill block can then be pivoted about the lower mating slot while an upper mating slot is urged into engagement with the upper rotating lug in order to hold the fill block on the retaining lug with a snap fit. So constructed, these fill blocks may be easily removed and replaced in order to provide fill blocks of varying configurations for use with varying article group size configurations, and thus carton sizes.

One problem that has arisen with the use of this type of fill block, however, is that fill blocks which can be easily removed and replaced from a flight lug can also be knocked off, or fall off, of the flight lug during packaging operations, and/or machine adjustment, i.e. removing damaged articles or containers, or removing jammed articles from the machine. This can occur when machine technicians lean over the article transport conveyor and accidentally strike the flight lugs, and thus the fill blocks, with their bodies. In addition, as an average article transport conveyor may have somewhere in the range of 200 or more flight lugs and fill blocks, cost dictates that the fill blocks cannot be machined to exact tolerances so that a "tight" snap fit is obtained as opposed to a "snug" snap fit, which thus allows for the cost efficient manufacture of fill blocks which are easy to remove and replace, but which are also easy to be inadvertently knocked off the flight lugs. In addition, the possibility exists that these fill blocks may be thrown off by the article transport conveyor itself as the flight lugs and the fill blocks pass over the end sprockets of the conveyor chain during operation of the article transport conveyor. As the flight lugs and fill blocks pass over the end sprockets, they do so at a greater angular rate of speed than the base of the flight lug connected to the conveyor chain, with the result that once the flight lug and fill block assembly rounds the sprocket and enters a return chain raceway, for example, an induced torque will occur in the fill block on the flight lug as the angular speed of the flight lug assembly decelerates to the linear speed of the conveyor chain with the result that this torquing can throw this type of fill block off of the flight lug, which in turn will result in carton skewing, and machine jamming should the flight lug be returned into a carton transport position without an accompanying fill block designed for that particular paperboard carton being moved along the path of travel.

What is needed, therefore, but seemingly unavailable in the art is a flight lug assembly adapted for use in the article transport conveyors of continuous motion packaging machines which provides flexibility, yet which will ensure that the fill blocks remain mounted on the flight lugs of the transport conveyor. More particularly, what is needed is a flight lug assembly having a removable fill block which can be easily removed and replaced, yet which can be locked to the flight lug of the assembly to prevent the fill block from being accidentally knocked off of the flight lug, or be thrown off of the flight lug, during machine adjustment, repair, and operation. What is also needed is a simple device which accomplishes these tasks but yet is adapted for use with a wide range of articles, packaging configurations, and carton sizes. Thus, what is needed but currently unavailable in the art is a simple and efficient flight lug assembly having fill blocks which can be easily removed and replaced in accordance with the requirements of the packaging machine operation, yet which can be locked to the flight lugs so that they are not otherwise removed from the flight lug when their removal is not intended in order to satisfy the demands for flexibility, and high production rates needed in the use of continuous motion packaging machines in high volume packaging operations.

SUMMARY OF THE INVENTION

The present invention provides an improved flight lug assembly for use on continuous motion packaging machines which overcomes some of the design deficiencies of other flight lug assemblies known in the art. The flight lug assembly of this invention provides a simple, efficient, and highly flexible device for releasably locking fill blocks on the respective ones of the upstanding flight lugs attached to the endless conveyor chain of an article transport conveyor used in a continuous motion packaging machine. The improved flight lug assembly of this invention thus minimizes the problems of inadvertent or unintended fill block removal, and thus lessens the likelihood of the skewing of the paperboard cartons prior to the passage of the articles to be packaged into the carton, thus lessening the likelihood of articles jamming the selector device, and allowing for increased production efficiency resulting from the prevention of the unintended damage or destruction of empty paperboard cartons, as well as damage to the articles being packaged therein, which result from cartons skewing within the flights of the article transport conveyor. The relative simplicity and ease of use of this device in comparison with known flight lug assemblies allows for a higher degree of flexibility in use in that this construction is readily adapted for fill blocks of varying sizes as needed for various article sized groupings, and paperboard configurations, while ensuring that the fill blocks remain mounted on the flight lugs in order to prevent the unintended or undesired shut down of the packaging machine in order to place the fill blocks back onto the flight lugs of the carton transport conveyor.

This invention attains this high degree of flexibility while maintaining simplicity and design and construction by providing an improved flight lug assembly having a flight lug, the flight lug being constructed and arranged to be mounted to the conveyor chain of a typical carton transport conveyor used on continuous motion packaging machines, and a fill block removably mounted on the flight lug, with means for releasably locking the fill block on the flight lug.

In a first embodiment of the invention, the means for releasably locking the fill block to the flight lug include an elongate flight lug slot defined within one of the side surfaces of the fill block, and an elongate groove defined in the same side surface and being in communication with at least a portion of the flight lug slot so that the groove forms a shoulder with respect to the flight lug slot. The flight lug of this embodiment has a spring clip fastened to one side thereof, one end of the spring clip being fastened to the free end of the upstanding lug and the other end of the spring clip being normally biased away from the side wall of the flight lug into a "sprung" position for being locked on the shoulder of the groove as the flight lug is moved within the flight lug slot and the second end of the spring clip passes over the shoulder of the groove, thus locking the fill block on the flight lug. To remove the fill block from the flight lug, the second end of the spring clip is depressed, whereupon the second end of the spring clip is yieldably urged toward the side wall of the flight lug within the flight lug slot as the fill block is being lifted off of the flight lug.

In a second embodiment of this invention, the means for releasably locking the fill block to the flight lug include a bore defined within the fill block intermediate the bottom and top surfaces thereof, a spring detent assembly received within the bore, the detent assembly having a spring-loaded detent normally biased into an extended position for engagement with a detent opening defined within the side wall of the upstanding flight lug. The spring-loaded detent is engaged with the detent opening in the flight lug when the fill block is lowered down onto, and locked into position on the flight lug, the flight lug being received within a flight lug slot defined in the fill block. A reciprocable release lever is slidably mounted on the fill block intermediate the detent assembly and the detent opening defined in the flight lug, the release lever having a tapered through-slot so that it is placed in substantial registry with the spring-loaded detent and the detent opening to allow the fill block to be locked to the flight lug. To release the fill block from the flight lug, the release lever is moved within a release lever slot formed as a part of the fill block so that the taper of the release lever urges the spring-loaded detent inwardly of the bore, thus releasing the spring detent assembly from the flight lug, whereupon the fill block is lifted off of the flight lug for replacement when, and as desired.

The unique and novel structure of this invention thus provides a simple, yet highly efficient means for ensuring that the fill blocks of flight lug assemblies are releasably locked to the flight lugs, and are not otherwise removed when not desired, thus ensuring increased machine efficiency. Moreover, due to the unique construction of this invention the fill block may be replaced with a fill block of the appropriate size and dimension for usage with differing paperboard cartons and containers, as desired and needed during packaging operation changeovers, i.e. when different product sizes, or product groupings are being packaged. This invention thus allows for greater flexibility in packaging operations, greater ease of maintenance, and greater ease of use than heretofore known in the art. Moreover, the novel structure of this invention allows for a high degree of flexibility in packaging machine operations which is less likely to lead to damaging the paperboard cartons during handling prior to, and after the transfer of articles from the article selector device into the cartons, and is thus less likely to result in jamming of the article selector device of the packaging machine, thus allowing for greater production rates than heretofore known in the art.

Accordingly, the objects of the present invention include the provision of an improved flight lug assembly having a removable fill block which can be releasably locked to the upstanding flight lugs of a carton transport conveyor, yet are constructed and arranged to be easily removed when needed for product size changeover. The present invention accomplishes this object, among others, while providing for flexible, efficient, and continuous high speed article packaging operations.

DETAILED DESCRIPTION OF THE PREFERRED EMBODIMENT

Figure 2:
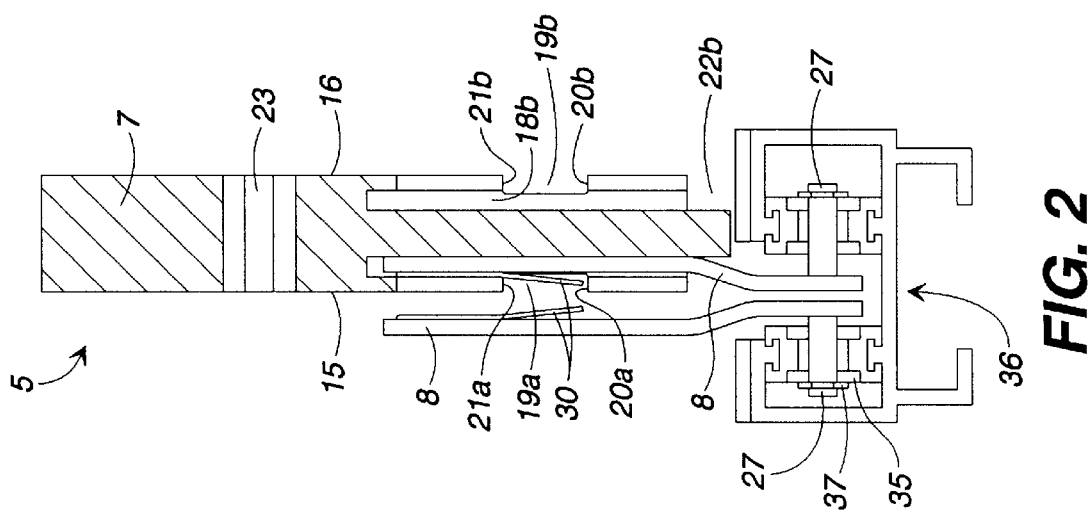
FIG. 2 is an end cross-sectional view along line 2—2 of the flight lug assembly of FIG. 1, illustrating the flight lug assembly of FIG. 1 mounted on a conveyor chain of an article transport conveyor.
Figure 1:
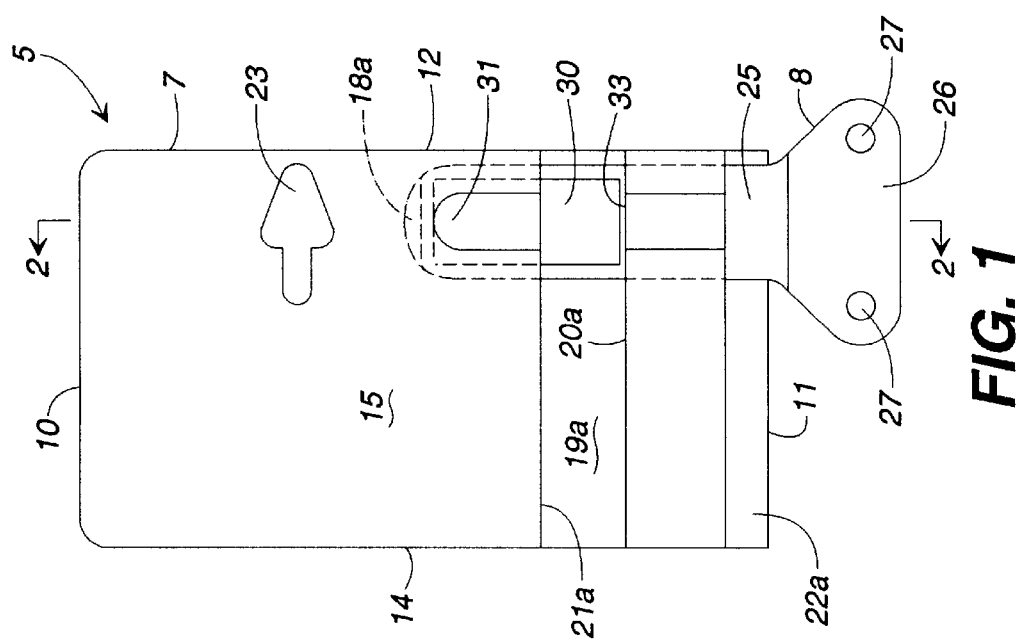
FIG. 1 is a side elevational view of a first preferred embodiment of the flight lug assembly of this invention.

Referring now to the drawings, in which like reference characters indicate like parts throughout the several views, a first preferred embodiment of a flight lug assembly 5 is illustrated in FIGS. 1 and 2. This embodiment of flight lug assembly 5 includes a fill block 7 mounted on a generally elongate flight lug 8. Fill block 7 has a top surface 10 and an opposed and parallel bottom surface 11, a front surface 12 and an opposed and parallel rear surface 14, the front and rear surfaces extending from the top surface to the bottom surface of the fill block, and a pair of opposed and parallel side surfaces 15, 16, each of which extends from the top surface to the bottom surface of the fill block, and from the front surface to the rear surface of the fill block.

As shown in FIGS. 1 and 2, fill block 7 includes a first flight lug slot 18a, and a spaced and parallel second flight lug slot 18b. The two flight lug slots 18a, 18b are defined one apiece in the respective side surfaces 15, 16 of fill block 7, as best shown in FIGS. 1 and 2. Each one of the two flight lug slots extends from the bottom surface 11 of the fill block toward top surface 10 thereof, although not extending all the way to the top surface of the fill block. Each one of the flight lug slots is sized and shaped to snugly received flight lug 8 therein so that the flight lug may be reciprocably passed within the flight lug slots. Both flight lug slots 18a, 18b are identical in size and configuration, are parallel to one another, and are co-axial with one another. As best shown in FIG. 1, flight lug slots 18a, 18b are positioned closer to the front surface 12 of the fill block than the rear surface in order to minimize any torsional bending or twisting in the fill blocks while being moved along an article transport conveyor 50 (FIG. 7), which can best be avoided by positioning the flight lug toward the front surface 12 of the fill block, rather than toward the rear surface. As shown in FIG. 1, each one of flight lug slots 18a, 18b forms a partially opened slot within the side surfaces 15, 16, respectively, of the fill block.

Still referring to FIGS. 1 and 2, one each of a pair of parallel grooves 19a, 19b are also defined within the respective side surfaces 15, 16 of the fill block. Each one of the grooves is positioned intermediate the top surface and the bottom surface of the fill block, and extends across the fall width of the fill block from front surface 12 to rear surface 14. Moreover, and as shown in FIGS. 1 and 2, grooves 19a, 19b are in communication with at least a portion of flight lug slots 18a, 18b, respectively. As best shown in FIG. 2, grooves 19a, 19b each have a pair of opposed shoulders 20a, 20b, and 21a, 21b, respectively, spaced from each other, parallel to each other, opposed from one another, and formed with respect to flight lug slots 18a, 18b, respectively. Each of flight lug slots 18a, 18b is open and in communication with at least that portion of grooves 19a, 19b, respectively, defined by shoulders 20a, 20b and 21a, 21b, respectively.

Figure 3:
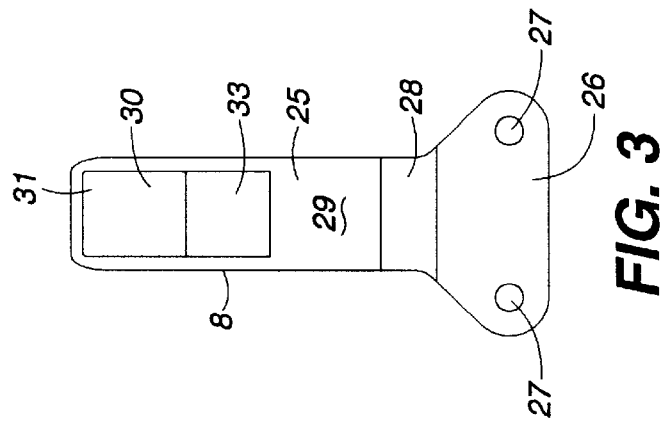
FIG. 3 is a side elevational view of a first embodiment of the flight lug of this invention.
Figure 4:
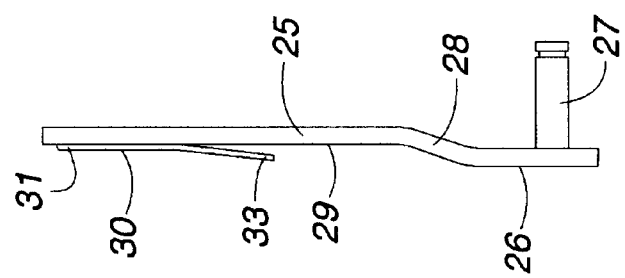
FIG. 4 is an end elevational view of the flight lug of FIG. 3.

A pair of parallel and spaced relief grooves 22a, 22b are defined in side surfaces 15, 16 of the fill block at bottom surface 11 for the purpose of allowing the fill block to be snugly received against flight lug 8 as shown in FIGS. 2–4, and as described in greater detail below. Lastly, fill block 7 includes a directional indicia, in this instance an arrow which indicates the desired orientation of the fill block on the flight lug, defined within side surfaces 15, 16, and extending through the thickness of the fill block as best shown in FIG. 2.

Both embodiments of fill block 7 as illustrated in FIGS. 1 through 6 are preferably constructed of an ultra-high molecular weight plastic which offers the benefits of ease of machinability coupled with a relatively low cost when compared with other plastics also suitable for fill block 7, to include delrin, nylon, and other similar plastic materials. Moreover, although it is preferred that fill block 7 be constructed of an ultra-high molecular weight plastic, fill block 7 may be constructed of any durable and rigid material which can be machined for being passed over flight lugs 8 as illustrated in FIGS. 2–6.

Figure 7:
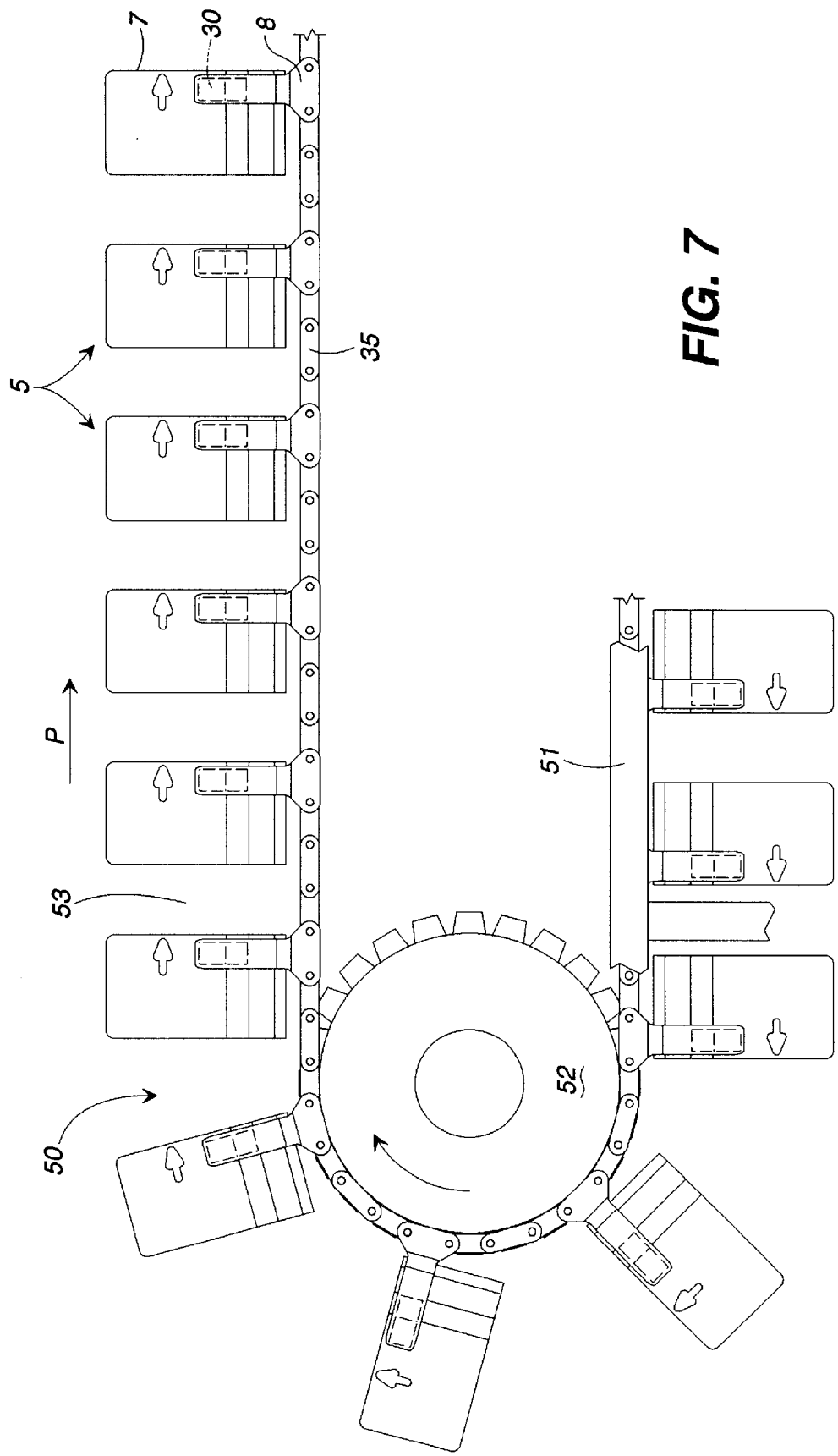
FIG. 7 is a side elevational view, partially in cross-section, of an article transport conveyor having a spaced series of flight lug assemblies affixed thereto.

Flight lug 8 is illustrated in greater detail in FIGS. 1–4. Flight lug 8 includes a generally elongate lug body 25 having a lug base 26 with two spaced and parallel mounting pins 27 extending perpendicularly therefrom. An intermediate portion 28 is formed between lug base 26 and lug body 25, intermediate portion 28 as shown in FIGS. 2 and 4 being angled with respect to the lug body and lug base so that successive ones of fill block 7, as best shown in FIG. 7, can be offset from one another along the length of the article transport conveyor in the event that a relatively small product size, i.e. pitch, or pocket size is being used along the length of the article transport conveyor. Moreover, the angled construction of intermediate portion 28 as shown in FIGS. 2 and 4 allows for lug body 25 to be received within flight lug slots 18a, 18b, respectively, defined inwardly of the side surfaces, respectively, of the fill block, to allow for greater side wall holding strength when a flight lug 8 is inserted within one of flight lug slots 18a, 18b so that side wall tear-out is prevented during usage of flight lug assembly 5.

As best shown in FIG. 3, flight lug 8 has at least one generally planar side surface 29 to which a spring clip 30 is fastened. Preferably, spring clip 30 is welded at its first end 31 to the free end of lug body 25 extending away from lug base 26. In the alternative, it is anticipated that if so desired spring clip 30 could be fastened to the lug body with countersunk machine screws, set screws, or other suitable holding devices, although it is preferred that the spring clip be welded directly to the lug body.

Spring clip 30 has a first end 31, fastened to lug body 35 as discussed hereinabove, and a spaced and free second end 33. As shown in FIGS. 2 and 4, second end 33 of spring clip 30 is "sprung" so that it is in a normally biased position extending away from side surface 29 of the flight lug. In usage, however, as flight lug 8 is passed into either one of flight lug slots 18a, 18b, that portion of side surfaces 15, 16, respectively, positioned intermediate grooves 19a, 19b and bottom surface 11, respectively, will urge the second end of the spring clip downwardly toward the side wall of the spring clip as it is passed within the respective one of the flight lug slots, until such time as the second end of the spring clip passes over either one of shoulders 20a, 20b, respectively, whereupon the second end of the spring clip will spring outwardly into its normally biased position so that the fill block cannot be lifted upwardly off of the flight lug as the second end of the spring clip will engage one of shoulders 20a or 20b, thus locking the fill block onto the flight lug. In order to remove the fill block from the flight lug, the second end of spring clip 30 is pressed inwardly toward the side wall of the lug body, the fill block is moved upwardly so that the lug body and the spring clip travel within the flight lug slot, the second end of the spring clip being yieldably urged toward, and being yieldably held against, side surface 29 of the lug body 25 by that portion of side surfaces 15, 16 of fill block 7 which are not defined as being open, i.e. in communication with, the respective one of flight lug slots 18a, 18b in which the flight lug is situated.

As shown in FIG. 2, flight lug 8 is fastened to a conveyor chain 35 of a conventional chain conveyor 36, formed as a part of an article transport conveyor 50 (FIG. 7) in known fashion, by a retaining clip 37 being passed over the free end of each one of mounting pins 27 so that flight lug 8 is affixed to the conveyor chain, and in turn to the article transport conveyor.

Figure 6:
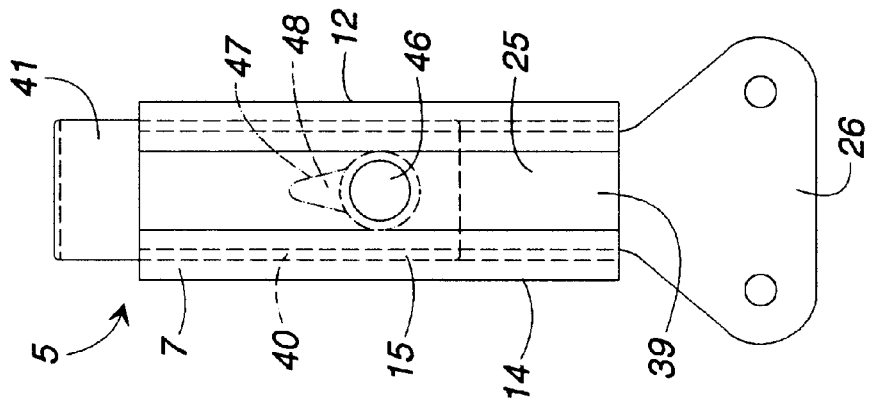
FIG. 6 is a side elevational view of the flight lug assembly of FIG. 5.
Figure 5:
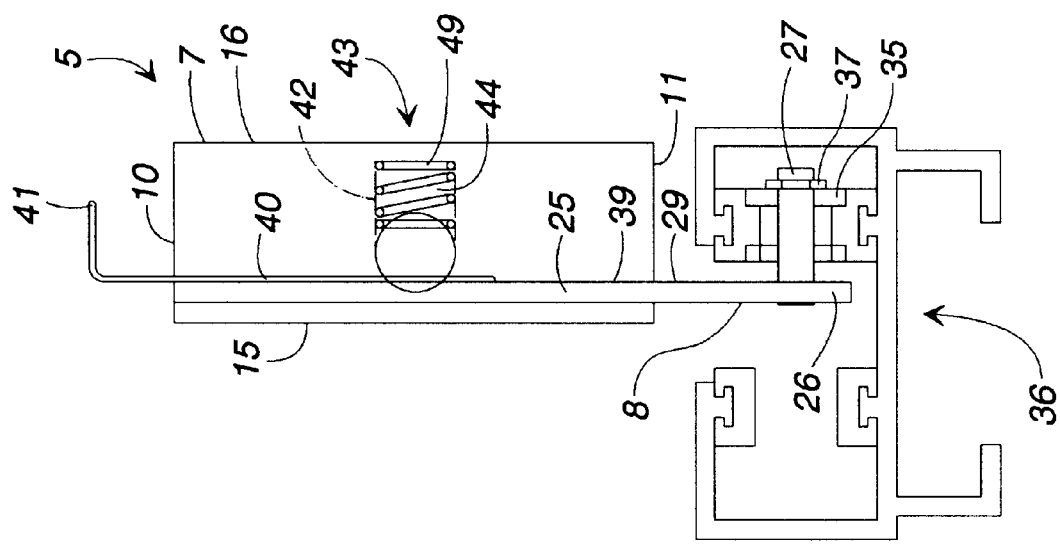
FIG. 5 is an end cross-sectioned view of a second preferred embodiment of the flight lug assembly of this invention affixed to the conveyor chain of an article transport conveyor.

A second preferred embodiment of flight lug assembly 5 is illustrated in FIGS. 5 and 6. As shown therein, fill block 7 of this embodiment of the flight lug assembly has an elongate flight lug slot 39 defined within side surface 15 of the fill block, and extending from bottom surface 11 toward top surface 10 of the fill block. If desired, flight lug slot 39 can extend completely from the bottom surface to the top surface of the fill block, although this is not required, and in fact it may be desirable to leave a closed portion, or pair of protrusions, extending within flight lug slot 39 toward the top surface 10 of the fill block in order to form a stop for flight lug 8 when passed therein. As shown in FIG. 6, flight lug slot 39 is at least partially in communication with, i.e., it is open, in side surface 15. Juxtaposed with flight lug slot 39 is an elongate lever slot 40 defined within fill block 7, and extending from top surface 10 toward bottom surface 11, although lever slot 40 does not extend all the way to bottom surface 11. An elongate release lever 41 is slidably, and snugly, received within lever slot 40, being passed into the lever slot through that portion of lever slot 40 defined in top surface 10 of the fill block. As best shown in FIG. 5, lever slot 40, and thus release lever 41, do not extend into flight lug slot 39, rather they are so defined, and positioned, respectively, within the fill block, that release lever 41 is positioned adjacent flight lug 8 when received within flight lug slot 39.

As best shown in FIG. 5, a bore 42 is defined within fill block 7, extending from flight lug slot 39 toward one of the side surfaces, in this instance a side surface 16, of fill block 7. A spring detent assembly 43 is received within the bore, the detent assembly having a spring-loaded detent 44 normally biased into an extended position so that the spring detent extends toward, and into, if allowed, flight lug slot 39. The spring detent assembly is positioned within the bore, and held therein by release lever 41 passed downwardly within lever slot 40 so that release lever 41 holds the spring detent assembly, and in particular the spring-loaded detent, within bore 42 of the fill block.

As shown in FIGS. 5 and 6, this embodiment of flight lug assembly 5 includes a flight lug 8 constructed and fashioned generally similar to that of flight lug 8 of the first embodiment, with the exception that flight lug 8 does not include an angled intermediate portion 28, but does include a detent opening 46 defined therein and extending therethrough, the detent opening being sized and shaped to receive at least a portion of spring-loaded detent 44 therein when release lever 41 is moved upwardly to allow the spring-loaded detent to be extended into its normally biased position into engagement with a through-slot 47 defined within release lever 41, illustrated in FIG. 6 in broken lines, and passing into detent opening 46. Thus, and as shown in FIG. 5, in its locked position, spring detent assembly 43 is in substantial registry with through-slot 47 and detent opening 46 to permit the spring-loaded detent to be passed through at least a portion of release lever 41, and into at least a portion of flight lug 8 by being received within detent opening 46. This has the effect of locking fill block 7 to the flight lug.

To release fill block 7 from the flight lug, i.e. to unlock the locking mechanism 41, 43, release lever 41 is moved downwardly within lever slot 40 so that the tapered portion 48 of through-slot 47 engages spring-loaded detent 44, and urges it inwardly of bore 42 against the bias of spring 49 of the spring detent assembly, whereupon fill body 7 may be lifted upwardly off of flight lug 8.

In operation, as best shown in FIG. 7, a spaced series of flight lug assemblies 5 are affixed along the length of an article transport conveyor 50. Article transport conveyor 50 is supported on the framework 51 of a packaging machine (not illustrated), and includes an endless conveyor chain 35 passed over a pair of toothed sprockets, only one of which is illustrated, sprocket 52, so that the conveyor chain moves in the direction of a path of travel denoted by the reference character P in FIG. 7. Upstream of sprocket 52 will be a carton magazine (not illustrated), and a carton-opening station (not illustrated), constructed and arranged to open a supply of carton blanks (not illustrated), into a series of opened, erect open end sleeve-type paperboard carriers or cartons (not illustrated), as known in the art. These cartons will be received within the flights 53, or pockets, of article transport conveyor 50 and will be moved therewith in the direction of the path of travel toward an article selector device (not illustrated) provided with a random supply of articles (not illustrated), being formed into pre-determined groups of articles (not illustrated), and passed into the open ends of the cartons in timed relationship with the movement of the cartons along the path of travel on the article transport conveyor. When it is desired to remove fill block 7 so that they may be replaced with fill blocks of a different configuration, i.e., width, thickness, and/or height, so they may be used with paperboard cartons of varying sizes, the fill block 7 is unlocked from flight lug 8 in the fashion described hereinabove for the two preferred embodiments of the invention. In FIG. 7, the first preferred embodiment of the invention, illustrated in FIGS. 1–4, is being used on the article transport conveyor, although the second embodiment of the invention illustrated in FIGS. 5 and 6 can also be used therewith, provided that the appropriate flight lugs 8 having detent openings 46 defined therein, are being used.

While preferred embodiments of the invention have been disclosed in the foregoing specification, it is understood by those skilled in the art that variations and modifications thereof can be made without departing from the spirit and scope of the invention, as set forth in the following claims. In addition, the corresponding structures, materials, acts, and equivalents of all means or step plus function elements in the claims, below, are intended to include any structure, material, or acts for performing the functions in combination with other claimed elements, as specifically claimed herein.

I claim:

1. A flighted article transport conveyor for moving a spaced series of articles along a path of travel, said article transport conveyor comprising:

a framework;

at least one endless conveyor chain supported on said framework and being moved in the direction of the path of travel;

a spaced series of flight lugs fastened to said at least one conveyor chain;

a fill block mounted on each respective one of said flight lugs for forming a spaced series of article receiving flights along the length of said conveyor chain; and a spring clip mounted to each of said flight lugs, wherein an end of each said spring clip engages each said fill block to releasably lock said fill blocks in position on their respective flight lugs.

2. A flight lug assembly, comprising:

a flight lug;

a fill block removably mounted on said flight lug; and a spring clip fastened on said flight, said spring clip being constructed and arranged to be yieldably biased wherein an end of said spring clip engages a shoulder formed as a part of said fill block for releasably locking said fill block.

3. A flight lug assembly for a flighted article transport conveyor, comprising a flight lug, a fill block removably mounted on said flight lug, said fill block being formed with a slot sized and configured to receive said flight lug, said flight lug being disposed within said slot, and a spring clip on said flight lug for releasably locking said fill block in place on said flight lug.

4. A flight lug assembly as claimed in claim 3 and further comprising a shoulder formed at a predetermined location in said slot, said spring clip engaging said shoulder for releasably locking said fill block in place on said flight lug.

5. A flight lug assembly as claimed in claim 4 and wherein said shoulder is defined by a groove formed in said fill block, said groove intersecting with said slot to form said shoulder.

6. A flight lug assembly comprising:

a flight lug having at least one elongate side surface;

a fill block removably mounted on said flight lug, said fill block having a bottom surface and an opposed top surface, a front surface and an opposed rear surface, said front surface and said rear surface each extending from said bottom surface to said top surface, and a pair of opposed side surfaces extending from said front surface to said rear surface;

said fill block being formed with at least one elongate flight lug slot extending from said bottom surface towards said top surface, said slot being sized and shaped to receive said flight lug therein for mounting said fill block on said flight lug;

a first groove defined in one of said side surfaces of said fill block, said first groove intersecting said flight lug slot to form a shoulder in said flight lug slot;

a spring clip for releasably locking said fill block on said flight lug, said spring clip having a first end fastened to said at least one side surface of said flight lug and a spaced second end constructed and arranged to be yieldably urged toward said at least one side surface of said flight lug within said flight lug slot and to be biased away from said at least one side surface of said flight lug into a locking position with respect to said shoulder as said flight lug is advanced into said flight lug slot.

7. The flight lug assembly of claim 6, said fill block comprising:

a first elongate flight lug slot defined within one of said side surfaces of said fill block, said first flight lug slot extending from said bottom surface toward said top surface;

a second elongate flight lug slot defined within the other one of said side surfaces of said fill block, said second flight lug slot extending from said bottom surface toward said top surface and being spaced from said first flight lug slot;

each said flight lug slot being sized and shaped to receive said flight lug therein.

8. The flight lug assembly of claim 7, said first groove being spaced intermediate said bottom surface and said top surface and extending from said front surface to said rear surface.

9. The flight lug assembly of claim 8, said fill block further comprising:

a second groove defined in the other one of said side surfaces, said second groove being parallel to said first groove and extending from said front surface to said rear surface of the fill block, wherein at least a portion of said second groove is in communication with at least a portion of said second flight lug slot;

and wherein said second groove has a shoulder formed with respect to said second flight lug slot.

10. A flight lug assembly, comprising:

a flight lug; a fill block removably mounted on said flight lug;

an integral spring loaded detent assembly formed as a part of said fill block; and a detent opening defined in a side surface of said flight lug in substantial registry with said detent assembly;

said detent assembly having a detent normally biased into an extended position toward said detent opening for engaging said detent opening.

11. The flight lug assembly of claim 10, said fill block further comprising a reciprocable release lever slidably supported on said fill block, said lever being positioned intermediate said detent assembly and said detent opening.

12. The flight lug assembly of claim 11, said release lever having a tapered through-slot defined therein and positioned in substantial registry with said detent and said detent opening when the fill block is mounted on the flight lug, the tapered through-slot of said lever being constructed and arranged to urge said detent away from said detent opening for releasing the detent assembly from engagement with the detent opening of the flight lug in response to the movement of the lever toward the top surface of the fill block.

* * * * *